3,504,150
PROCESS FOR THE INDUCTIVE HEATING OF WORKPIECES HAVING CONTINUOUSLY CHANGING RADII OF CURVATURE

Gerhard Seulen and Friedhelm Reinke, Remscheid, Germany, assignors to AEG-Elotherm G.m.b.H., Remscheid-Hasten, Germany
No Drawing. Filed Sept. 27, 1967, Ser. No. 672,419
Claims priority, application Germany, Oct. 14, 1966, A 53,770
Int. Cl. H05b 5/08
U.S. Cl. 219—10.43                         2 Claims

ABSTRACT OF THE DISCLOSURE

Metal workpieces which have continuously changing radii of curvature in a peripheral direction, e.g. cams, are inductively heated in a manner to overcome differential heating effects due to assymetrical shape, namely by reducing the frequency of the heating current when the temperature of the surface portion of the smallest radius of curvature has reached the Curie temperature.

---

This invention relates to the inductive heating of workpieces having continuously changing radii of curvature in a peripheral direction, such as for example disk-cams used in diesel-engine construction, high-speed printing machines and other machine tools, or cams or cam-shafts which are generally known for spark-ignition and diesel-engines.

When inductively heating such workpieces, inductors have been used which have a circular inner diameter, and with such inductors the coupling gap between inductor and the various sections of the periphery changes. Also inductors have been proposed which do not completely surround the workpiece or section of a workpiece to be hardened. Such open inductors have a segmental inner space so that again the coupling gap between the inner surface of the inductor and the outer surface of the workpiece changes. It has also previously been the practice to adapt the inductors to the peripheral shape of the stationary workpieces to achieve a uniform coupling gap between inductor and workpiece over the whole periphery of the workpiece.

In the processes and arrangements used hitherto, uniform heating of such workpieces or workpiece sections is difficult, which difficulties increase when the radii of curvature of the individual workpiece section differ to a great extent. For example, inductive heating of cams which have a particularly sharp nose are greater than cams which have a relatively larger radius of curvature of the cam nose.

It has been established that during the inductive heating of such workpieces, the heating effect depends inter alia on the frequency of the heating current used. If a workpiece with a constantly changing radius of curvature in the peripheral direction is inductively heated with a fixed frequency, as has previously been done, then at a high frequency of heating current there is a greatly enchanced heating effect in the part of the workpiece which has a small radius of curvature, for instance the nose of a cam, which leads to an increase in the depth of heating, leading on subsequent hardening to a greater depth of hardening in the region of the cam nose in comparison with other portions of the cam. This increase in the depth of hardening increases the danger of flaking or peeling of the hardened layer in the region of the cam nose. There is also the possibility of overheating taking place, leading to the production of a course grain structure and generation of unfavourable stresses in the region of the cam nose.

If a low frequency heating current is used, then areas of diminished area of curvature, e.g. the cam nose, lag behind in the degree of heating, resulting in insufficient heating and subsequent hardening of such areas. When attempts are made to remedy this effect by an extension of the heating time, in many instances the workpiece was hardened all the way through since the heat is distributed over the whole cross-section from areas of relatively high radii of curvature. Thus when heating cams by this method, the cam nose is heated by heat-conduction of the material when brought to the hardening temperature, and not by eddy currents during induction heating. The results are the more unsatisfactory the greater the differences in radius of curvature.

The invention provides a process in which the disadvantages described are obviated, in which the frequency of the inductive heating current used is reduced when that portion of the workpiece surface having the smallest radius of curvature has attained approximately the Curie temperature.

This process has the particular advantage that, at the beginning of the heating, the workpiece surface having the smallest radius of curvature, e.g. the cam nose, heats at a relatively fast rate due to the higher heating current frequency chosen. The surface portion of higher radius of curvature e.g. the cam arc, remains however at the temperature reached in the first stage of inductive heating. This is to be attributed to the fact that the cam nose for example, on account of its lesser radius of curvature, has a smaller mass in comparison with the cam arc, whereby a relatively better heat-accumulation is achieved. Moreover the coupling gap between the cam nose and the inductor with a circular inner cross-section, is smaller than the coupling gap between the cam arc and the inductor inner surface, and thus leads also to a greater heating effect.

By reduction of frequency of the heating current according to the invention, the heating efficiency and in consequence the power consumption, of the work-piece surfaces is reduced for the surface portions having small radii of curvature. In the regions with a relatively large radius of curvatures, e.g. the cam arc, the reduction of frequency is, on the contrary, not effective in affecting the power consumption, and the temperature of these regions is thus greatly raised, the cam nose merely consuming enough power to cover heat loss, together with a very slow increase of temperature.

The frequency change in the process of the invention may be carried out in such a way that both steel workpiece regions attain the hardening-temperature lying above AC 3 line of the iron-carbon equilibrium diagram, practically simultaneously. The time corresponding to the actual form of the workpiece up to changeover or the total heating time can readily be determined by routine tests, as may the frequencies to be chosen.

According to a preferred feature of the process according to the invention, an increase of the specific power in the workpiece is carried out simultaneously with the frequency changeover. By this means, the effect previously explained is reinforced, because the increased power with frequency reduction results in an improvement in heating practically exclusively to those regions of the workpiece having the greater radii of curvature. By this means the temperature in the cam arc of a steel cam is raised to a still further extent, compared with the cam nose. Again, the particular amount of power increase in relation to the form of the workpiece, may be determined by simple tests.

For carrying out the process of the invention, various arrangements may be used. For example, two rotating generators for medium-frequency voltages of different frequency can be provided as energy sources, the outputs of which are optionally connectable to the heat transmitters and/or heat conductors acting as consuming elements. By this means, the power of the two generators can be differently designed in order, for example, to be able to work at a lower frequency with a higher power density.

Instead of the two generators with different driving means, a medium-frequency generator can also be provided which is driven by a polarity reversing driving motor. On attaining the Curie temperature, the polarity reversing motor may then be switched over to the lower speed of rotation. Alternatively, a single phase medium-frequency generator can be used, the driving motor of which is reduced in its speed of rotation on attaining the Curie temperature, so that, by increasing the slip by means of the introduction of resistances in the feeder- or rotor-circuit, the desired frequency change takes place. A complete shut-off from the supply network can also be provided for reducing the speed of rotation and thereby the frequency.

A particularly convenient arrangement for carrying out the process of the invention consists of an inverter fitted with controllable electric valves such as tubes or semiconductors, which feeds the heating arrangement. Here also the frequency is continuously or intermittently changed over in the region of the Curie point in order to effect the second phase of heating according to the invention.

What is claimed is:

1. A process for inductive heating of metal workpieces which have continuously changing radii of curvature in the peripheral direction to provide a uniform surface-temperature distribution, comprising:
   inductively heating said workpieces with a relatively high frequency heating current to heat that portion of each of said workpieces having the smallest radius of curvature until said portion has attained substantially the Curie temperature;
   reducing the frequency of the heating current employed;
   inductively heating said workpiece with said reduced frequency heating current to heat those portions of each of said workpieces having relatively larger radii of curvature while substantially maintaining the temperature of said portions having the smallest radius of curvature; and
   increasing the power associated with said heating current at substantially the same time as the frequency of said heating current is reduced whereby the heating of those portions of said workpieces having said relatively larger radii of curvature is reinforced.

2. A process for inductive heating of metal workpieces which have continuously changing radii of curvature in the peripheral direction to provide a uniform surface-temperature distribution, comprising:
   inductively heating said workpieces with a relatively high frequency heating current to heat that portion of each of said workpieces having the smallest radius of curvature until said portion has attained substantially the Curie temperature;
   reducing the frequency of the heating current employed; and
   increasing the power associated with said heating current at substantially the same time as the frequency of said heating current is reduced whereby the heatting of those portions of said workpieces having said relatively larger radii of curvature is reinforced.

References Cited

UNITED STATES PATENTS

| | | | |
|---|---|---|---|
| 1,900,842 | 3/1933 | Northrup | 219—155 |
| 2,444,259 | 6/1948 | Jordan | 219—10.43 |
| 3,332,036 | 7/1967 | Kappenhagen et al. | 219—10.75 |

JOSEPH V. TRUHE, Primary Examiner

L. H. BENDER, Assistant Examiner

U.S. Cl. X.R.

219—10.59